(12) United States Patent
Lindh

(10) Patent No.: US 7,733,993 B2
(45) Date of Patent: Jun. 8, 2010

(54) PHASE NOISE CANCELING OFDM RECEIVER

(75) Inventor: Lars Lindh, Helsinki (FI)

(73) Assignee: Nokia Corporation, Espoo (FI)

( * ) Notice: Subject to any disclaimer, the term of this patent is extended or adjusted under 35 U.S.C. 154(b) by 829 days.

(21) Appl. No.: 11/251,515

(22) Filed: Oct. 14, 2005

(65) Prior Publication Data

US 2007/0086533 A1     Apr. 19, 2007

(51) Int. Cl.
    H03D 1/04    (2006.01)
(52) U.S. Cl. .................. 375/346; 375/219; 375/316; 375/297; 455/278.1; 704/205
(58) Field of Classification Search .................. 375/346, 375/219, 316, 297; 455/278.1; 704/205
    See application file for complete search history.

(56) References Cited

U.S. PATENT DOCUMENTS

| | | | |
|---|---|---|---|
| 2004/0057374 A1* | 3/2004 | Bott et al. .................. | 370/206 |
| 2004/0156309 A1 | 8/2004 | Chadha et al. .............. | 370/208 |
| 2004/0171366 A1* | 9/2004 | Bar-Ness et al. ......... | 455/278.1 |
| 2004/0184522 A1* | 9/2004 | Kravtsov .................... | 375/233 |
| 2004/0190637 A1* | 9/2004 | Maltsev et al. ............. | 375/260 |
| 2005/0031029 A1 | 2/2005 | Yamaguchi et al. ......... | 375/226 |
| 2005/0273320 A1* | 12/2005 | Yamaguchi et al. ......... | 704/205 |
| 2006/0064725 A1* | 3/2006 | Rabinowitz et al. ........... | 725/68 |
| 2006/0262868 A1* | 11/2006 | Leshem ...................... | 375/260 |

FOREIGN PATENT DOCUMENTS

| | | |
|---|---|---|
| EP | 0 719 004 A2 | 6/1996 |
| EP | 1 624 636 A1 | 2/2006 |
| WO | WO 02/103974 A1 | 12/2002 |

OTHER PUBLICATIONS

Simon, V. et al., "Phase Noise Estimation via Adapted Interpolation", 2001 IEEE, pp. 3297-3301.

* cited by examiner

*Primary Examiner*—David C Payne
*Assistant Examiner*—Zewdu Kassa
(74) *Attorney, Agent, or Firm*—Harrington & Smith

(57) ABSTRACT

A receiver includes, in series, at least one receive antenna, a buffer, and arithmetic logic block, a symbol detector, and a phase noise estimator. A further feedback loop couples an output of the phase noise estimator to an input of the arithmetic logic block for providing an estimate of phase noise. The buffer is for storing the received signal. The arithmetic logic block, such as a multiplier, is for removing the estimate of phase noise, received via the feedback loop, from the buffered signal. The symbol detector is for estimating a symbol from the output of the arithmetic logic block. The phase noise estimator estimates phase noise from two inputs received from the symbol detector: the estimated symbol and the remainder signal. Preferably, the phase noise estimator performs an IFFT on these two inputs and Kalman filters the result. Iteratively estimating the phase noise improves precision substantially.

20 Claims, 18 Drawing Sheets

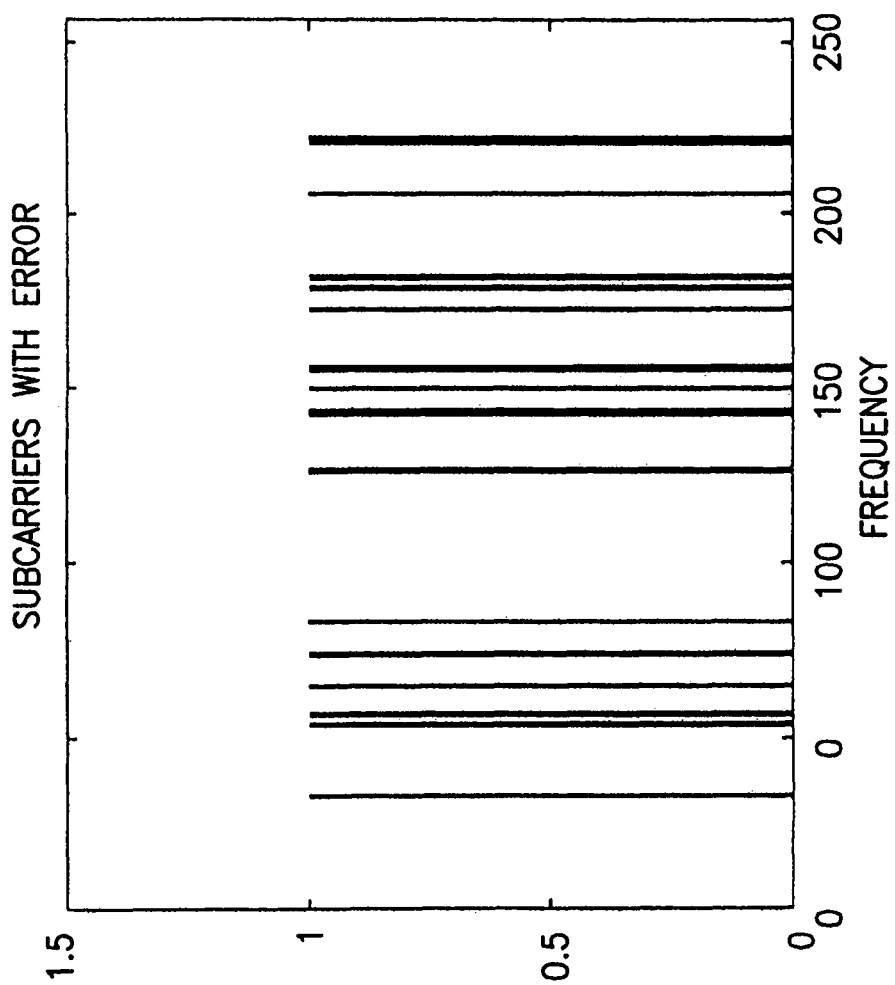

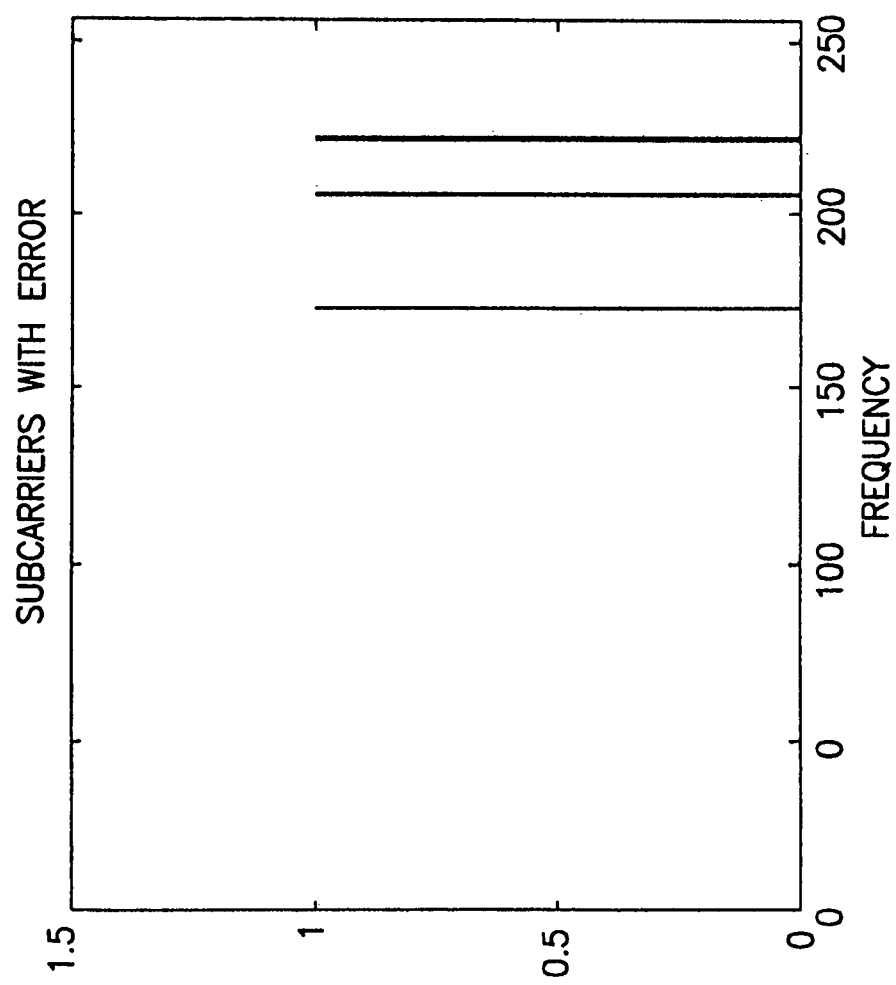

PHASE NOISE CANCELING OFDM RECEIVER

TECHNICAL FIELD

This disclosure relates to correcting phase in a multi-carrier communication system, and particularly relates to canceling phase noise in an OFDM receiver.

BACKGROUND

Frequency division multiplexing (FDM) is a technology that transmits multiple signals simultaneously over a single transmission path, such as a cable or wireless system. Each signal travels within its own unique frequency range (carrier), which is modulated by the data (text, voice, video, etc.).

An orthogonal FDM (OFDM) technique distributes the data over a large number of carriers that are spaced apart at defined frequencies. This spacing provides the "orthogonality" of the OFDM approach, and prevents the demodulators from seeing frequencies other than their own. The benefits of OFDM include high spectral efficiency, resiliency to RF interference, and lower multipath distortion. This is useful because in a typical terrestrial wireless communications implementation there are multipath channels (i.e., the transmitted signal arrives at the receiver using various paths of different length).

OFDM has been successfully deployed in indoor wireless LAN and outdoor broadcasting applications. For example, OFDM has been selected as the multiple access scheme by several standard organizations, including IEEE 802.11, IEEE 802.16, BVB-T (digital video broadcast-terrestrial), and DVB-H (handheld). OFDM beneficially reduces the influence of ISI with a complexity that is less than that of typical single carrier adaptive equalizers. OFDM has also been found to work well in multipath fading channels. These and other advantages render OFDM a strong candidate for use in future mobile communication systems, such as one being referred to as 4G (fourth generation).

While adoption as above in multiple standards proves that OFDM is an excellent candidate for multipath propagation, it is vulnerable to phase noise. Phase noise arises in the up-conversion at the transmitter, and in the down-conversion at the receiver, where the local oscillators behave in less than an ideal manner. An important feature of OFDM is the orthogonality of the sub-carriers. Phase noise from the local oscillators threatens that orthogonality. As would be expected, the sensitivity of any particular OFDM implementation depends from the sub-carrier distance from one another. Low frequency phase noise, typically termed common phase noise CPE, has been corrected in the prior art by rotating the signal constellation with the aid of pilot tones or pilot signals. High frequency phase noise introduces inter-carrier interference ICI. Unlike inter-symbol interference ISI where multiple versions of the same signal interfere with one another due to recovered multipath propagation, ICI appears as additive Gaussian noise to the receiver. Traditionally, this was countered in the prior art by simply using high quality local oscillators to reduce any phase noise imposed from the start. At high frequencies (e.g., about 60 GHz and greater), phase noise imposed even from these higher quality local oscillators does not reduce ICI to a sufficient degree that sub-carrier orthogonality, as seen by the receiver, can be maintained. This is true at least for higher level modulation schemes (e.g., 16 QAM, 64 QAM).

The inventors have devised an approach that corrects phase noise in both low and high frequency regimes, as detailed below, thereby correcting for ICI. While described in the context of OFDM in particular, the phase noise correction techniques described herein do not depend from particularities of OFDM but are readily extendable to any multi-carrier signaling regimen, including multi-carrier CDMA (MC-CDMA) and other multi-carrier communication protocols that may yet be developed that are not inconsistent with these teachings.

SUMMARY

The foregoing and other problems are overcome, and other advantages are realized, in accordance with the presently described embodiments of these teachings.

Embodiments of the invention include a method for processing a received signal. In the method, a signal is received over a plurality of orthogonal subcarriers and stored/buffered. That the subcarriers in practice are not exactly orthogonal due to noise does not remove them from the definition of orthogonal; the invention is directed to correcting phase noise that in certain instances may itself undermine exact orthogonality of the subcarriers. The subcarriers are considered orthogonal if the transmission regimen with which they were sent operates on the premise of orthogonal (or nearly-orthogonal) subcarriers. Further in the method, a symbol is estimated from the buffered signal and decision noise is determined from the buffered signal and the estimated symbol. Decision noise may be considered the remainder of the (symbol-bounded) signal after subtracting the estimated symbol, though not necessarily the entire remainder. For example, the remainder may not include portions of the signal corrected for common phase error. Phase noise is then estimated from the decision noise and the estimated symbol, and the estimated phase noise is canceled from the buffered signal to yield a phase noise corrected estimated symbol.

Another embodiment of the invention is a receiver that includes means for receiving a signal over a plurality of orthogonal subcarriers, such as receive antennas. The receiver further includes, in series, a buffer, and arithmetic logic block, a symbol detector, and a phase noise estimator. A further feedback loop couples an output of the phase noise estimator to an input of the arithmetic logic block for providing an estimate of phase noise. The buffer is for storing the received signal. The arithmetic logic block is for canceling the estimate of phase noise, received via the feedback loop, from the buffered signal. The symbol detector is for estimating a symbol from the output of the arithmetic logic block. And the phase noise estimator estimates phase noise from two inputs from the symbol detector: the estimated symbol and the remainder signal. Considerations for the orthogonal subcarriers and the remainder signal are as stated above, and apply throughout this disclosure.

Another embodiment of the invention is an apparatus that includes means for estimating a symbol from a received and buffered signal, means for iteratively estimating phase noise from the estimated symbol and a remainder signal, and means for canceling the iteratively estimated phase noise from the buffered signal. Estimating a symbol from the buffered signal, after canceling the iteratively estimated phase noise from it, then will yield an iteratively phase noise corrected symbol estimate. Embodiments of these various means are detailed in the following detailed description and in the claims.

The invention may be embodied as a program of machine-readable instructions, tangibly embodied on an information bearing medium and executable by a digital data processor, to perform actions directed toward processing a received signal. The actions include estimating a symbol from a received and buffered signal, determining decision noise from the received signal and the estimated symbol, estimating phase noise from the decision noise and the estimated symbol, and canceling the estimated phase noise from the buffered signal, and estimating from it (the buffered signal after the estimated phase noise is canceled from it) a phase noise corrected estimated symbol. These actions may be executed by hardware, firmware, software, or various combinations as detailed herein. As will be detailed, preferably the program iteratively determines phase noise estimates for the same estimated symbol.

Another embodiment, also a program of machine-readable instructions tangibly embodied on an information bearing medium and executable by a digital data processor to perform actions directed toward processing a received signal, includes the actions of estimating a symbol from a signal received over a plurality of orthogonal frequency division multiplexed sub-carriers, and iteratively estimating phase noise from the estimated symbol and a remainder signal by an inverse Fourier transform. An additional action is then canceling the iteratively estimated phase noise from the signal.

Another receiver embodiment includes a symbol detector, for estimating from a received signal, an estimated frequency domain symbol and a frequency domain decision noise. The receiver further includes means for converting the estimated frequency domain symbol and the frequency domain decision noise to the time domain. An example of such means is a processor that executes an IFFT on its input. Further in the receiver is at least one Kalman filter for estimating phase noise from the time domain converted estimated symbol and the time domain converted decision noise. The receiver also includes a recursive feedback loop for canceling from the received signal an accumulation of phase noise estimates from the Kalman filter.

Another embodiment of the invention is a method of processing a received signal as follows. From a received signal is estimated a frequency domain symbol and a frequency domain decision noise. The estimated frequency domain symbol and the frequency domain decision noise are then converted to the time domain. The time domain converted estimated symbol and time domain converted decision noise are then filtered, in the time domain, to achieve a phase noise estimate. At least one iterative estimate of phase noise is also computed by iteratively estimating, converting, and filtering as recited above. From the received signal, the phase noise estimate and the at least one iterative estimate of phase noise is canceled.

Further details as to various embodiments and implementations are detailed below.

BRIEF DESCRIPTION OF THE DRAWINGS

The foregoing and other aspects of these teachings are made more evident in the following Detailed Description, when read in conjunction with the attached Drawing Figures, wherein:

FIGS. 5A-5B, 6A-6B, 7A-7B, 8A-8B, and 9A-9B are similar to FIGS. 4A-4B, but respectively showing results for two, three, four, five and six iterations of the described phase canceling technique.

DETAILED DESCRIPTION OF EMBODIMENTS OF THE INVENTION

In general terms, some receiver embodiments of the invention operate to estimate phase noise during a symbol (or other interval), accumulate that estimate in a buffer, and cancel the estimated phase noise from the signal, without the necessity of pilot or training tones to inform the receiver of signal phase. Results are greatly improved by passing the signal several times through the estimator. Specifically, the receiver performs operations such as synchronization, channel estimation and correction, and common phase error correction according to known methods to arrive at a result that represents a decision symbol plus what is termed herein as decision noise. Decision noise is that remainder after subtracting the decided symbol constellation point from the received signal. The phase noise is within the decision noise, and is estimated by a Kalman filter using an inverse Fourier transform process. That phase noise estimate is fed back and subtracted from the original signal, which was stored in a buffer. Repeating the above for the same buffered signal, after the current phase noise estimate is canceled, yields a phase noise estimate that reflects actual phase noise to an increasing degree, all without the need for additional pilot tones/training sequences that occupy bandwidth. Further details are provided below.

Figure 1:
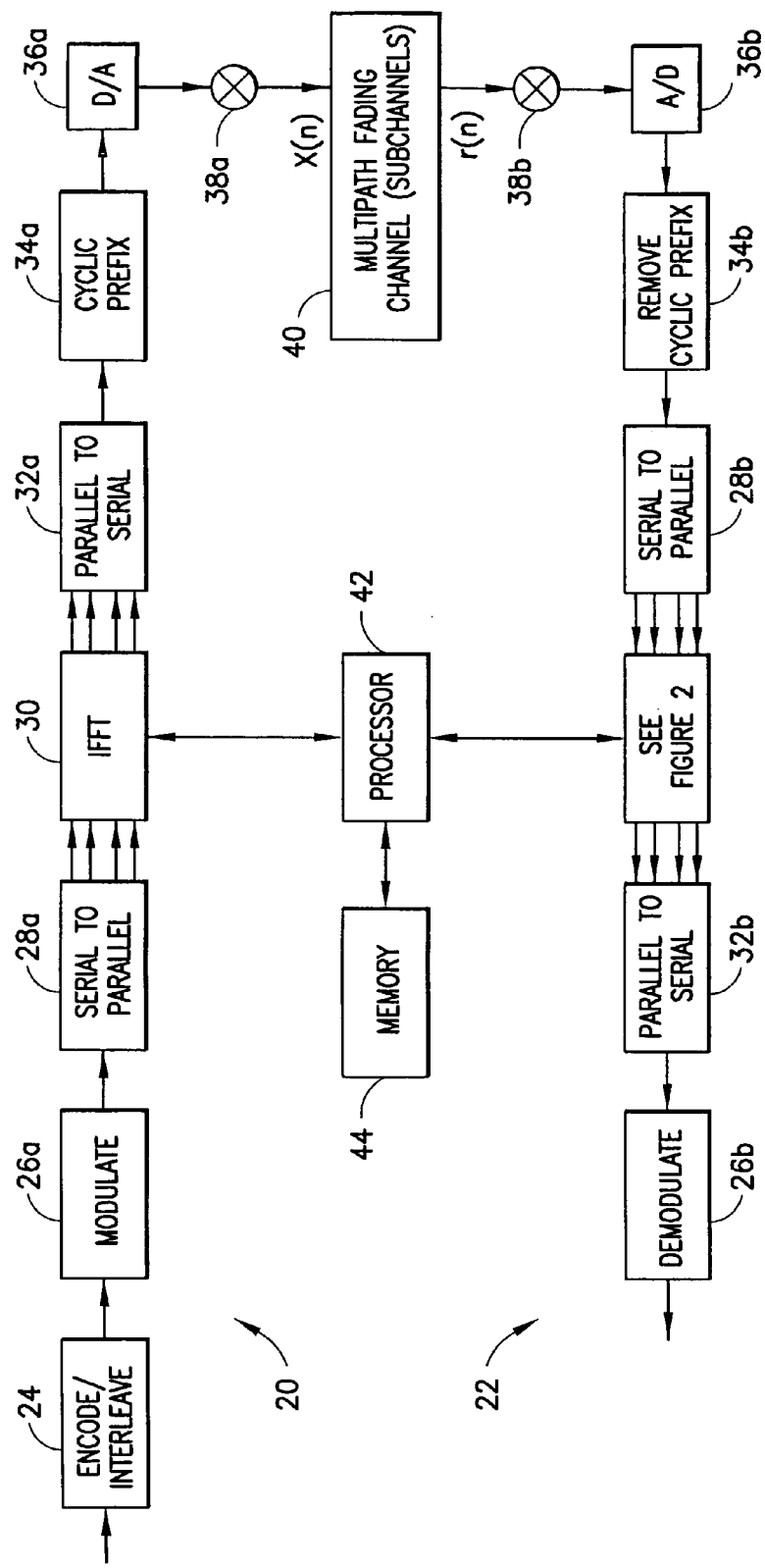
FIGS. 1 is a schematic block diagram of relevant portions of an OFDM transmitter and receiver.

FIG. 1 illustrates a block diagram of representative functions within an OFDM transmitter 20 and receiver 22. In the transmitter, source data is encoded and interleaved at an encoder 24, then modulated at a modulator 26a that may be fixed or adaptive as known in OFDM. After serial to parallel conversion at block 28a, the multiple parallel data streams are transformed by an inverse Fourier transform block 30. In a spread spectrum embodiment, this is where spreading codes and potentially scrambling codes are applied. The parallel data streams are then serialized at block 32a, a cyclic prefix is added at block 34a, the result is digitized at an analog to digital converter 36a, upconverted 38a to carrier frequencies, and the signal, represented by the symbol X(n), is transmitted over one or more transmit antennas (not shown) over a multipath fading channel 40 which consists of a plurality of frequency overlapping sub-channels separated by orthogonality.

In some respects the process at the receiver 22 operates in reverse. The received signal, represented as r(t), is downconverted 38b and converted to digital 36b, the cyclic prefix is removed 34b, and is parallelized 28b for processing within block 42, to be described in further detail below with respect to FIGS. 2-3. The decisions from that block 42 are then serialized 32b, demodulated 26b, and decoded/deinterleaved (not shown) for a final result. Several of the various functional blocks displayed may be re-ordered as known in the art and not all process blocks necessary for an OFDM transceiver are shown, as others are far afield of these teachings. Some functions may be combined into single physical components and some may be divided among several. As is typical, the transmitter 20 and receiver 22 are embodied in a transceiver that share a processor 42 and a memory 44, as well as other functional components that are often patterned on a common digital signal processing chip. FIG. 1 is merely to give a general context of one relevant environment, and it is in the functions of the receiver 22 embodiments that are advantageous.

Embodiments of the invention may be disposed in any host computing device having a receiver that processes data received from another device or node, whether or not the host device receives its data wirelessly. A common embodiment is in a mobile station, a handheld portable device that is capable of wirelessly accessing a communication network, such as a mobile telephony network of base stations that are coupled to a publicly switched telephone network. A cellular telephone, a Blackberry® device, a laptop computer with communication capability, and a personal digital assistant (PDA) with internet or other two-way communication capability are examples of a mobile station. These teachings may also be used to advantage in other portable radios such as walkie talkies and devices that may access only local networks such as a wireless localized area network (WLAN) or a WIFI network.

Figure 2:
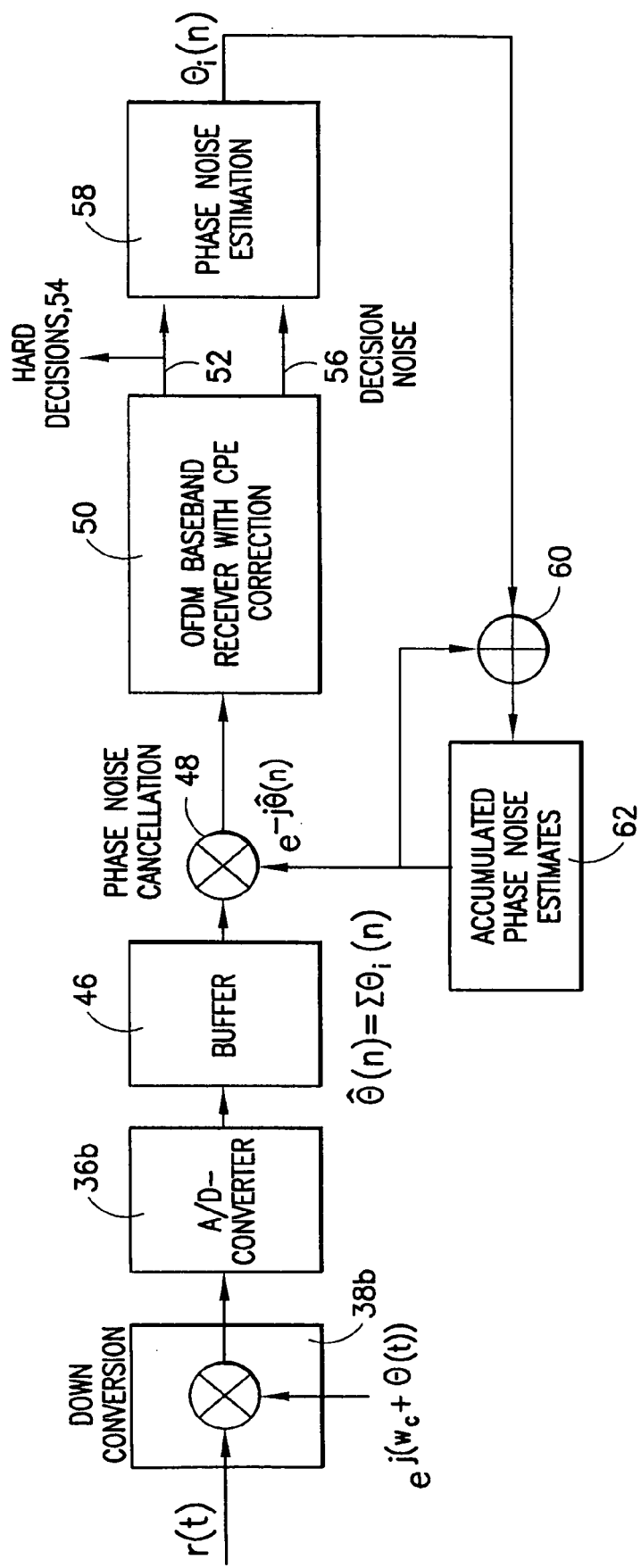
FIG. 2 is a schematic block diagram showing further detail of the receiver of FIG. 1 that employ phase noise cancellation according to embodiments of the invention.

An embodiment of the invention is shown in block diagram at FIG. 2. The received signal r(t) is downconverted 38b by a function $e^{j(\omega_c + \theta(t))}$ and converted to digital by the analog to digital converter 36b. The subcarrier frequency $\omega$ and the subcarrier phase $\theta$ are determined as known in the art, such as by pilot signals. Other processing may be interposed between or following those processing blocks 38b, 36b without detracting from the inventive aspects herein. The digitized version of the signal is stored in a buffer 46, and a copy is output to a logical block/multiplier 48 at which an estimate of phase noise $\hat{\theta}(n)$ is removed as $e^{-j\hat{\theta}(n)}$, where the index (n) represents the symbol being operated on. Specifics as to how the phase error estimate is computed will be described with reference to FIG. 3, and each successive computing of phase error estimate on the same buffered signal is a single iteration. In a first pass before any estimate of phase noise is computed, the copy of the signal output from the buffer 46 is unchanged at the multiplier 48.

In each iteration and including the first pass of the buffered signal, the receiver 22 corrects for CPE as is known in the art to arrive at an estimated symbol decision. This processing may include synchronization, channel estimation and correction, correcting for common phase error, and unwanted constellation rotations using pilot tones in each symbol of an OFDM symbol, and is represented in general at block 50. Relevant teachings in this regard may be found in U.S. Patent Publication No. US 2004/0156309 A1 by Kanu Chadha and Manish Bhardwaj, published on Aug. 12, 2004 and incorporated by reference. This reference relates primarily to correcting CPE rather than ICI. A hard decision 52 that is to be output for serialization, demodulation, and decoding/deinterleaving (as in FIG. 1) is not output until after the final iteration of the phase correction process. Until that iteration, consider the symbol decided in block 50 to be a soft decision 52 and the "hard decision" pathway 54 to be switched off. The final iteration may be determined by a threshold register that stores a threshold number of iterations against which a counter is compared. In some embodiments, the value in that threshold register may be adaptable to the power of the high frequency phase noise being experienced. The receiver can estimate total phase noise from a preamble, or may set the threshold value to correspond to the point at which improvements over the phase noise estimate accumulated from the previous iteration fall become too low. For example, where the threshold is set at five but it is determined that there is minimal change between a third and fourth iteration of the phase estimate calculation, the threshold may be automatically updated to three iterations to reflect actual channel conditions and accuracy of the first few iterations of phase estimates. In some embodiments, the number of iterations/value of the threshold register may be adaptable to the particular channel being used.

Considering for the moment that the switch enabling a hard decision 54 to be output is open and no hard decision 54 is output for decoding, the processing block 50 outputs both a soft decision 52 and decision noise 56. From those two outputs are determined in the phase noise estimation block 58 a single iteration of phase noise estimate $\theta_i(n)$, where the index n refers to a particular symbol and the index i refers to the current iteration of phase noise estimation for that $n^{th}$ symbol. Each $i^{th}$ iteration of phase noise estimate is accumulated in a phase noise estimate accumulator 62, which in FIG. 2 uses a feedback adder 60 so that only a single value of phase noise, accumulated over the current $i^{th}$ iteration, is stored. After each $i^{th}$ iteration, the current estimate of phase noise is applied to the signal output from the buffer, in order that subsequent iteration to compute phase noise close on the true value. At any $i^{th}$ iteration, the current estimate of phase noise is the accumulated phase noise estimate for that iteration and all previous ones on that $n^{th}$ symbol. Once the desired number of iterations is complete (e.g., after i=3, 5 or however many iterations the process uses), the phase noise accumulator 62 outputs the estimate $\hat{\theta}(n)$ for the $n^{th}$ symbol, where it is multiplied as $e^{-j\hat{\theta}(n)}$ by the buffered signal at the multiplier 48. Being that the buffered signal remains unchanged until after it is output, the accumulated i iterations of phase noise are only ever applied to the uncorrected signal in the buffer. Following each iteration, the buffered signal with the $i^{th}$ accumulated phase noise estimate applied is then processed again in processing block 50, correcting for CPE and synchronization. Only upon the final iteration is a hard decision 54 output for serialization 32b and further processing as described with reference to FIG. 1.

An alternative to the above is as follows. Rather than accumulating the iteratively computed phase errors and applying the accumulation to the originally buffered signal, each iteration of phase error computation may be applied to the buffered signal, and with each phase error correction the signal stored in the buffer is replaced by the most-recent corrected version. This is seen as slightly less efficient as the circuitry is slightly less elegant and the read/write processes in re-setting the buffer are slightly larger than the read/write processes in accumulating the iterative phase error, but the end result is seen to be identical. In such an alternative embodiment, the phase error accumulator 62 and the adder 60 are unnecessary, but a feedback loop leading from the output of the multiplier 48 to the buffer 46 would be necessary to replace the buffered signal with that version of itself corrected for the current iteration of phase noise estimate at the multiplier 48.

Figure 3:
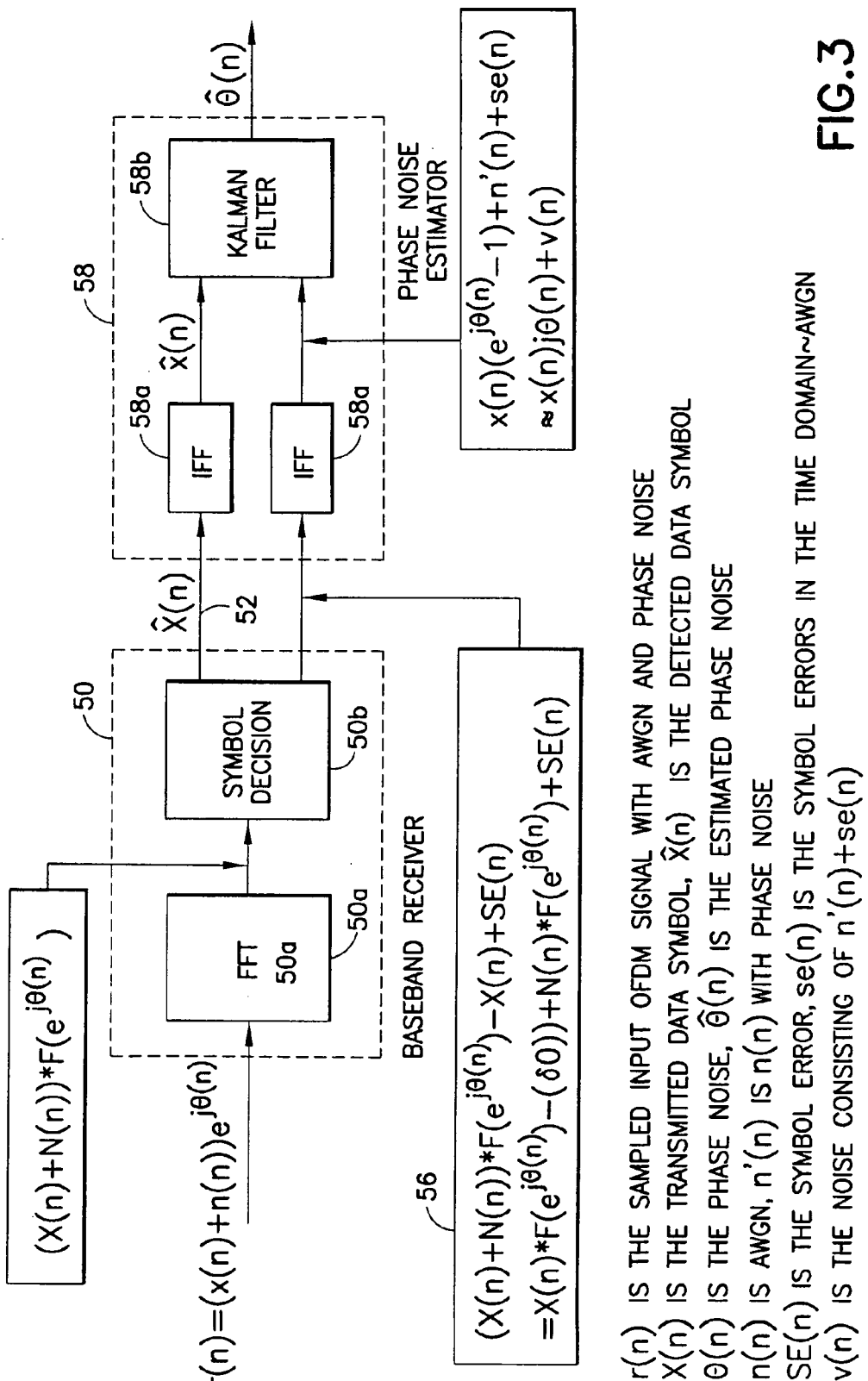
FIG. 3 is a schematic block diagram showing further detail of FIG. 2 to derive the phase noise estimates.

Now described with reference to FIG. 3 is a particular embodiment for estimating phase noise in accordance with these teachings, operable with either the block diagram of FIG. 2 or the alternative modification of it described immediately above. In processing block 50, the signal is fast Fourier transformed 50a and a (soft) symbol decision is made at decision block 50b. The signal input into the processing block 50 is $r(n) = [(x(n) + n(n))e^{j\theta(n)}]$, where $x(n)$ is the sampled output OFDM signal, $n(n)$ is additive white Gaussian noise AWGN, and $e^{j\theta(n)}$ is phase noise. Following fast Fourier transforming at block 50a, the signal is then $(X(n)+N(n))*F(e^{j\Theta(n)})$, where $X(n)$ is the transmitted data symbol, $N(n)$ is AWGN, and F represents the Fourier transform on the parenthetical value that follows it. The soft symbol decision $\tilde{X}(n)$ is an estimated or detected symbol, which is output on line 52. Considering SE(n) as the symbol error, the remainder from the signal r(n) is then:

$$[X(n)+N(n)]*F(e^{j\Theta(n)})-X(n)+SE(n)=X(n)*(F(e^{j\Theta(n)})-\delta(0))+N(n)*F(e^{j\Theta(n)})+SE(n)$$

which is output as decision error along line 56.

In the phase noise estimation block 58, an inverse fast Fourier transform is executed at blocks 58a on both the detected symbol $\hat{X}(n)$ and on the decision error value from the equation above. The IFFT converts to the time domain its frequency domain input. An IFFT on the detected symbol $\hat{X}(n)$ yields simply the estimated symbol $\hat{x}(i)$. Using n'(n) to represent AWGN with phase noise, se(n) to represent symbol error in the time domain, and v(n) to represent noise consisting of n'(n)+se(n), the IFFT on the decision error is then $x(n)(e^{j\Theta(n)}-1)+n'(n)+se(n)\approx x(n)j\theta(n)+v(n)$. Kalman filtering at block 58b the IFFT results of the detected symbol and the decision error is seen to give the best estimate of system state with this noisy data, though other filtering may be substituted. The output of the Kalman filter 58b is then the $i^{th}$ iteration of the phase noise estimation process.

The underlying theory is as follows. When the local oscillators are phase locked, the phase noise may be modeled as a stationary process $\theta(n+1)=\theta(n)+\omega(n)$. The phase noise may be observed from the output through the measurement matrix $x(n)$ by $x(n)j\theta)n)=v(n)$, where v)n) is the measurement noise. The Kalman filter input comes from the symbol decision process, and the Kalman parameters are set according to the local oscillator characteristics and the current modulation. With adaptive modulation as in some variations of OFDM, these filter parameters are adjusted with the modulation.

The advantage of iterating the above process is shown sequentially in FIGS. 4A-B through 9A-B. Simulation parameters for these diagrams are as follows: 256 subcarriers of which 200 are used, 192 subcarriers used for data and 8 subcarriers used for pilot tones, with 16 QAM modulation. Phase noise was controlled to −65 dB per subcarrier (dBc) and −3 dB at a corner frequency of 100 KHz. A phase noise floor was controlled at −140 dBc, the channel spread was 10 MHz, and SNR was 18 dB.

Figure 4A:
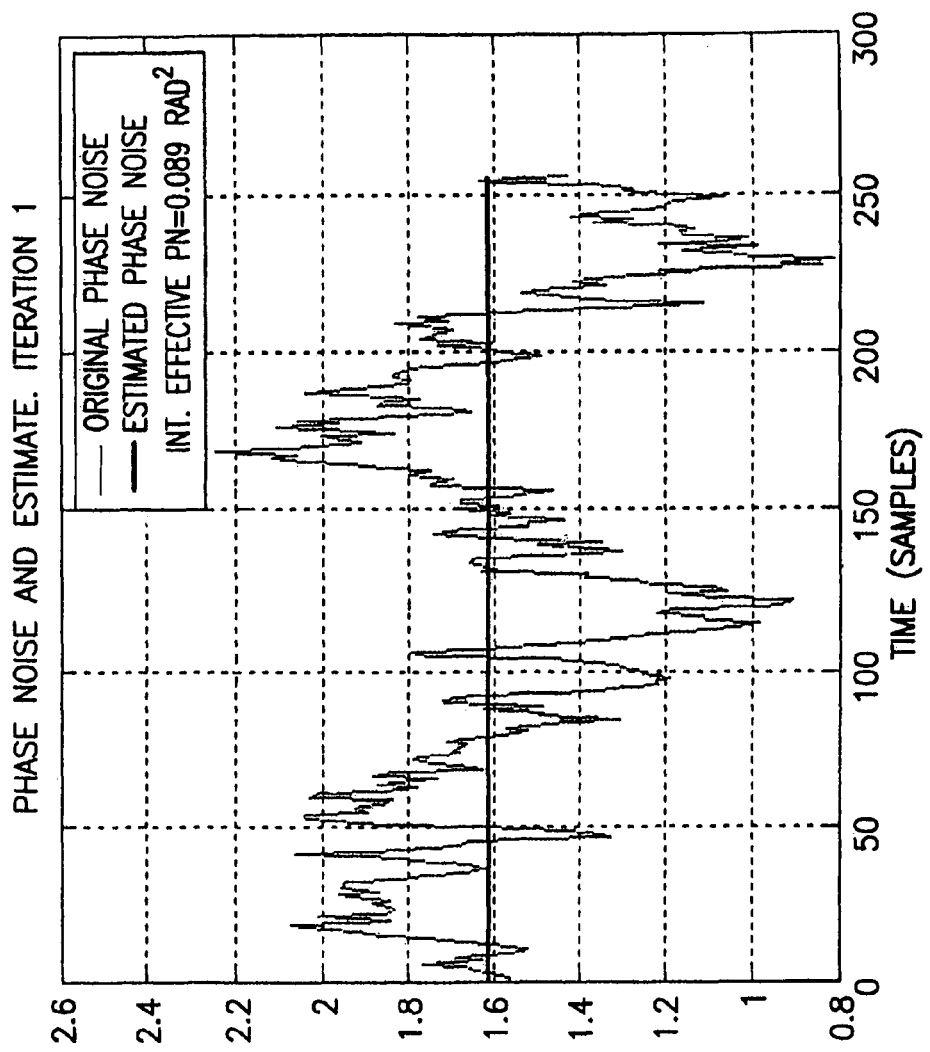
FIG. 4A is a graph showing actual versus estimated phase noise using a single iteration of the described canceling technique.
Figure 4B:
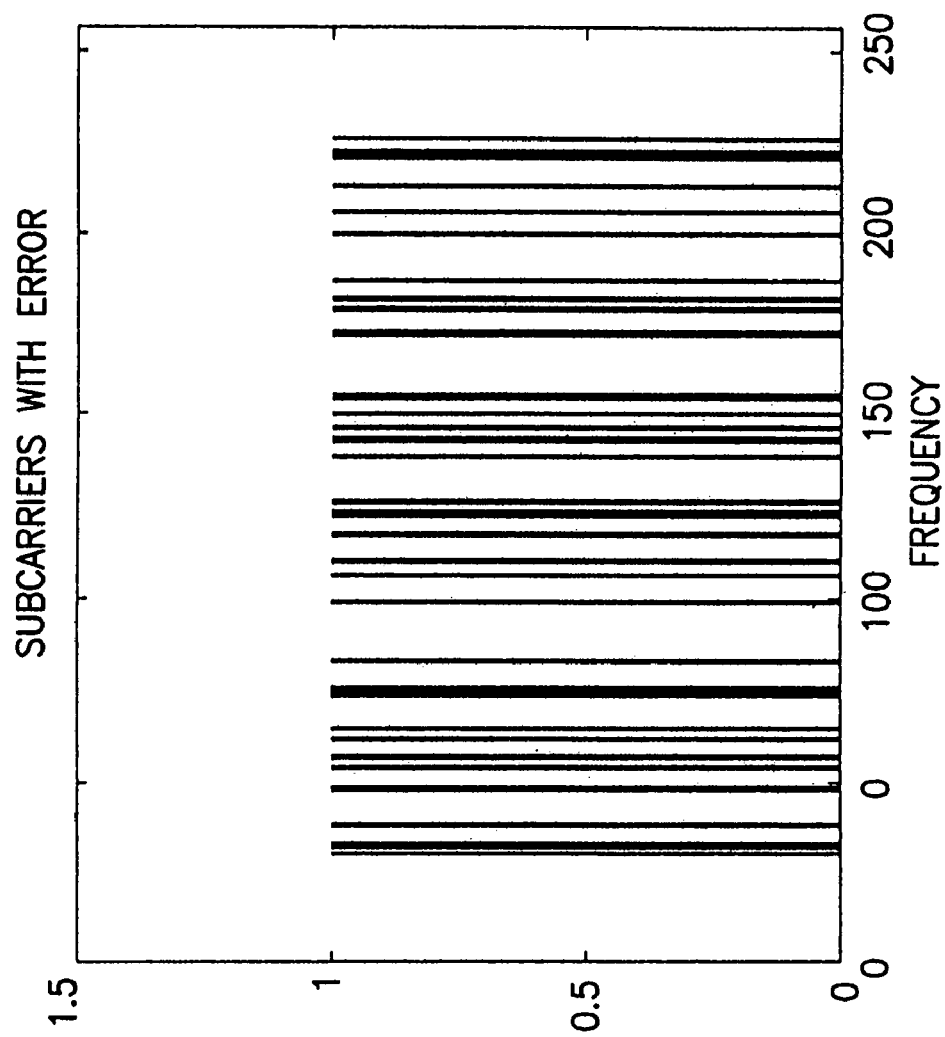
FIG. 4B is a graph showing sub-carriers having remaining errors due to phase noise when canceled using a single iteration.
Figure 5A:
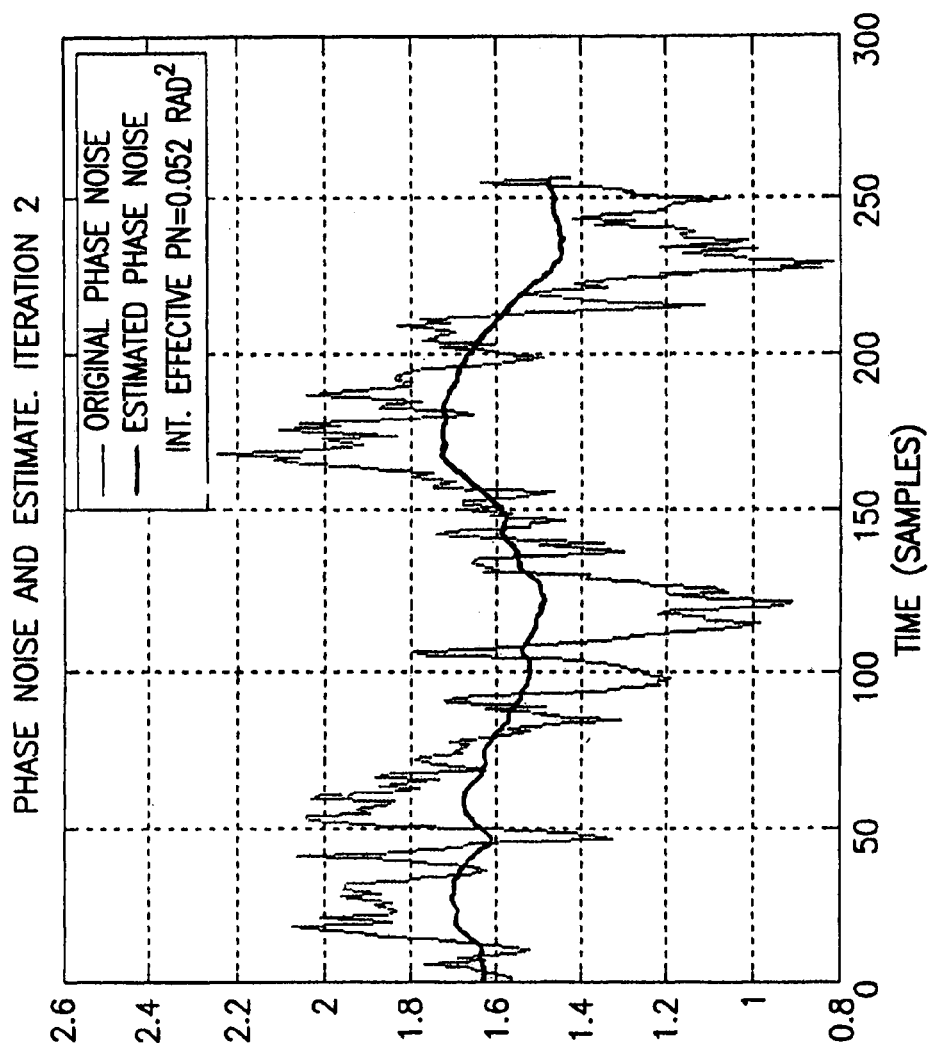

FIG. 4A illustrates original phase noise and a straight-line estimate of phase noise in a first iteration of the process as described above. FIG. 4B shows on which subcarriers the phase noise error was most pronounced after correcting with a first-iteration estimate of phase noise. Clearly, the results of this simulation for this first iteration are not sufficiently robust.

Figure 6A:
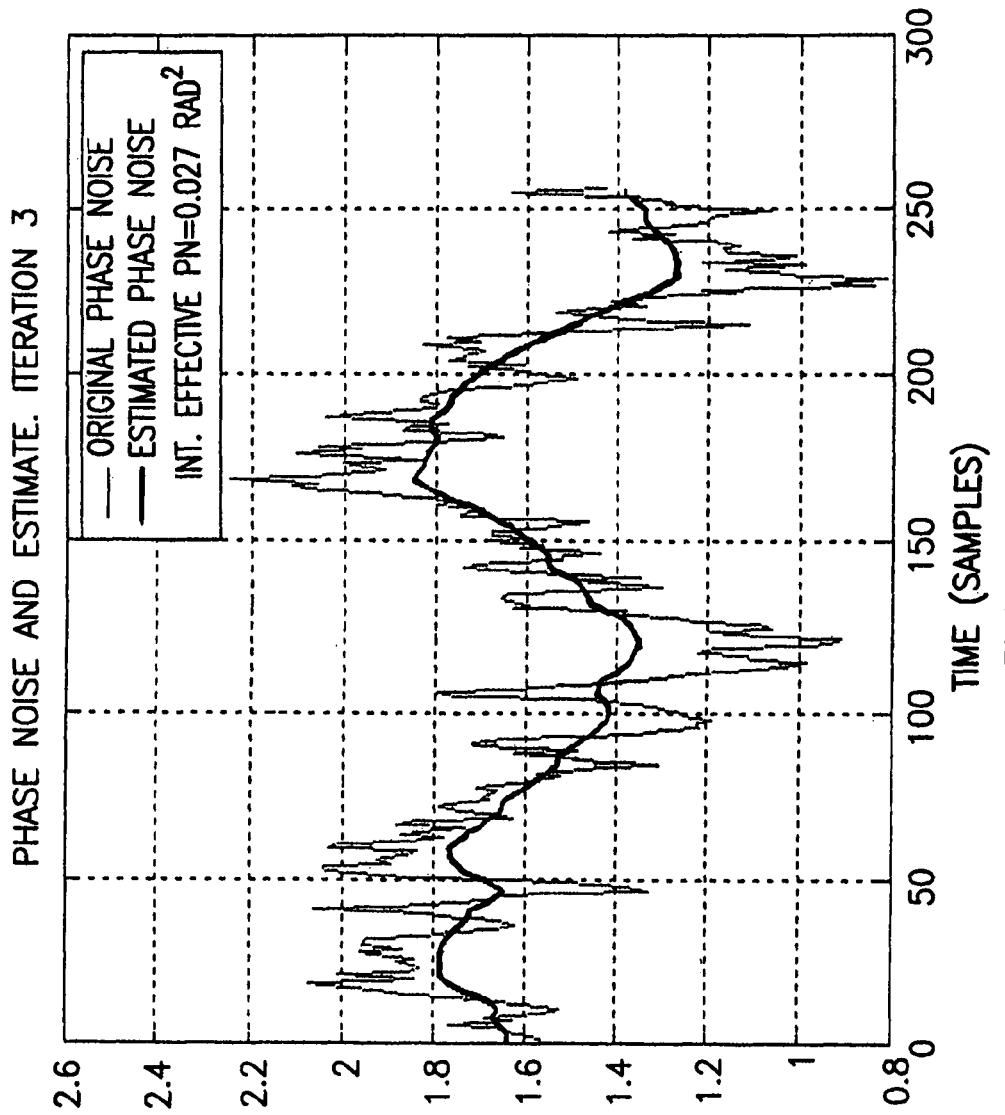
Figure 6B:
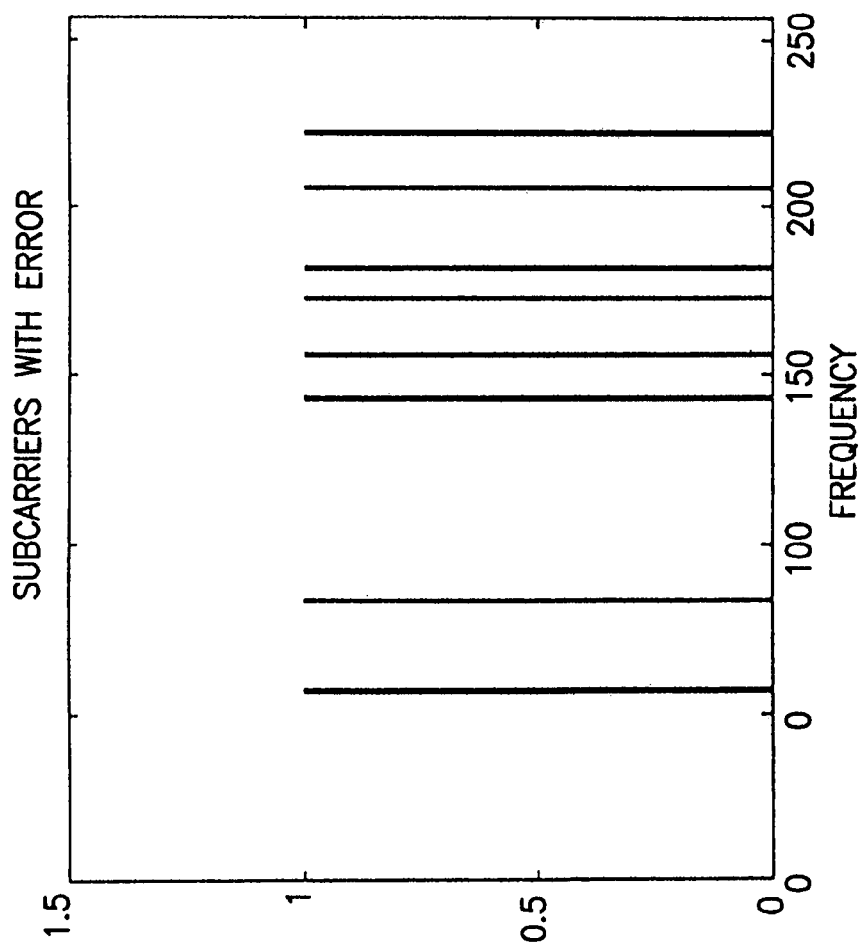
Figure 7A:
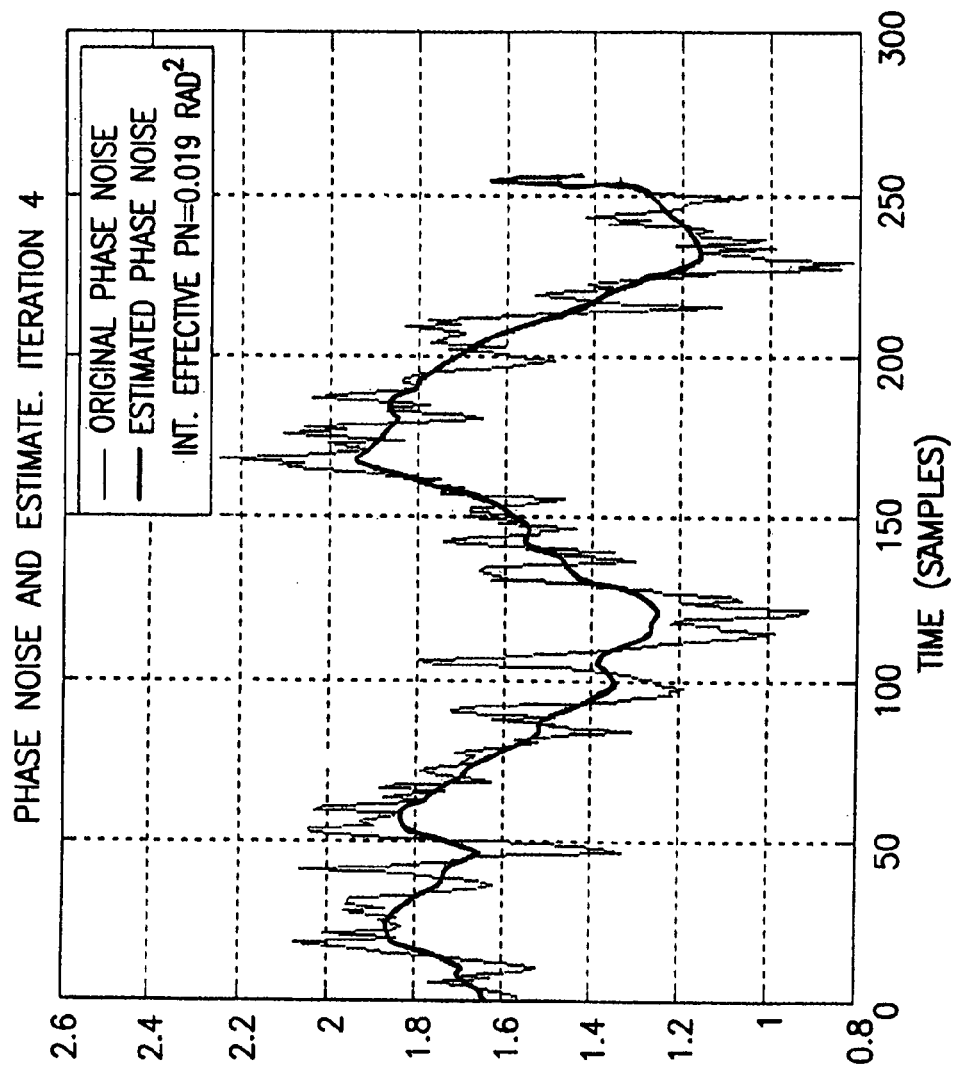
Figure 7B:
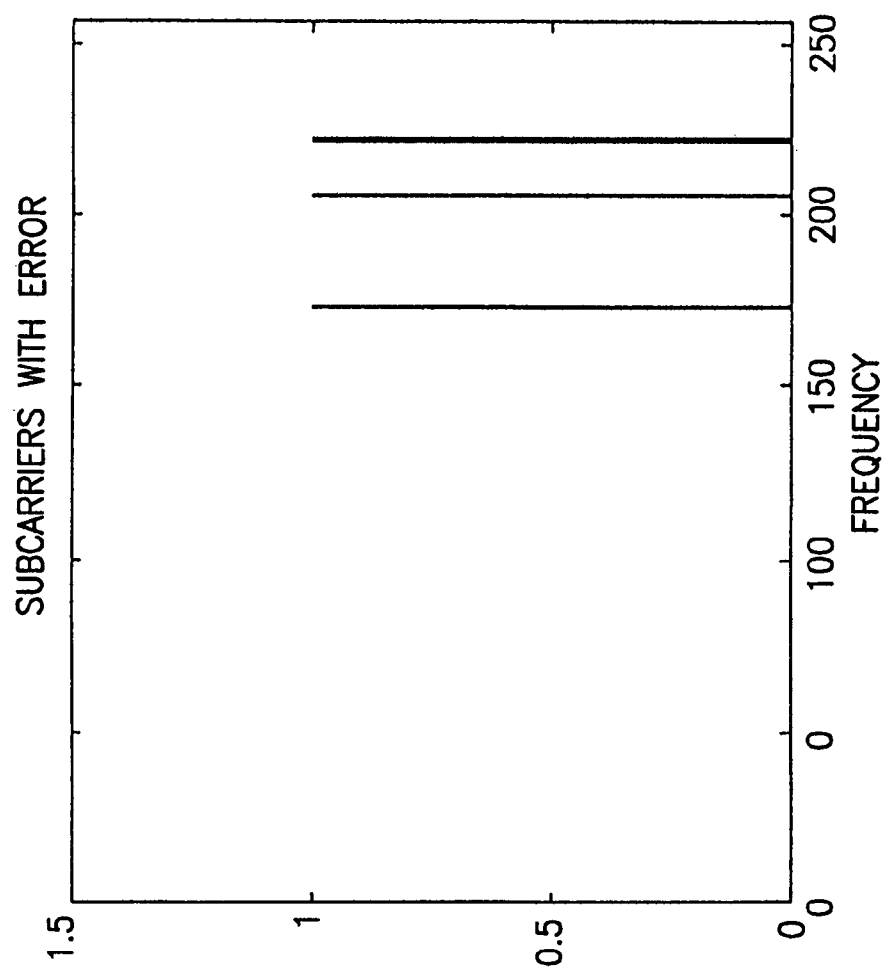
Figure 8A:
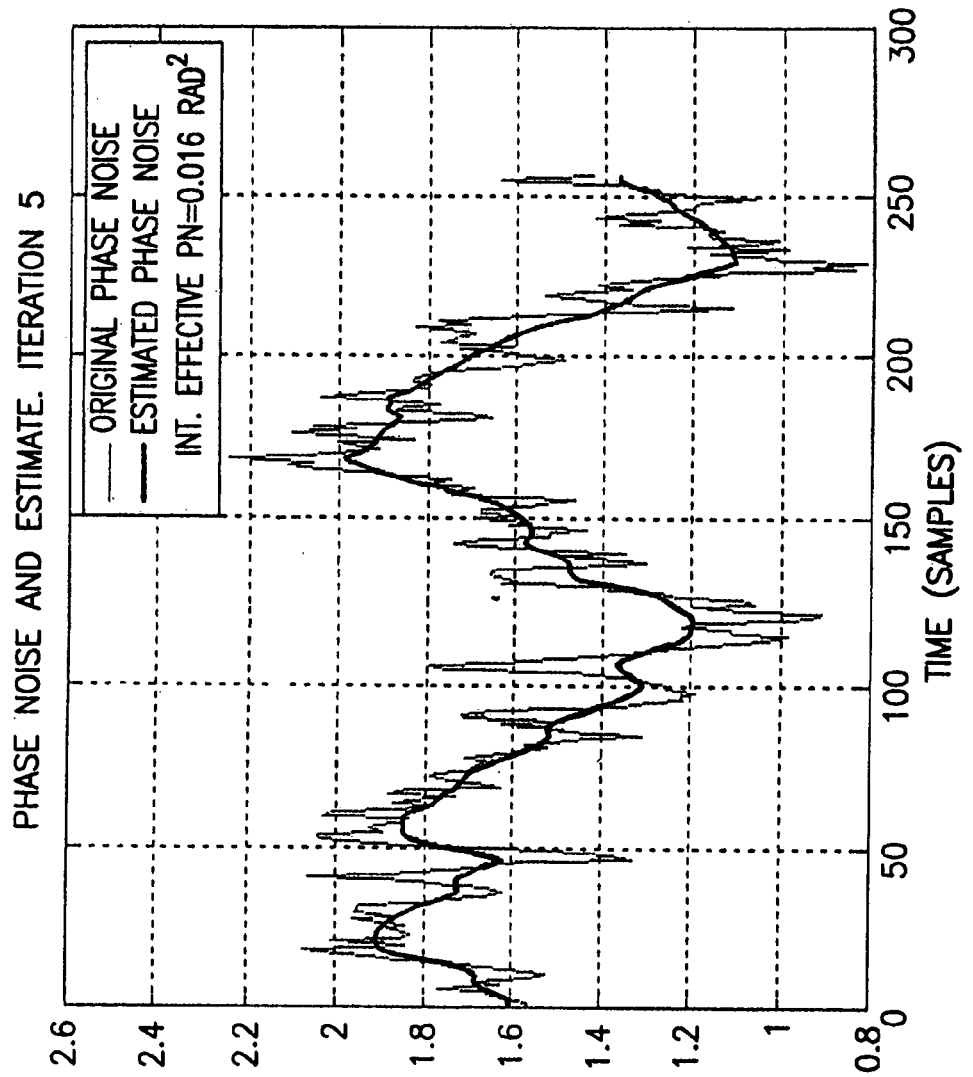

FIGS. 5A-5B through 9A-9B illustrate respective second through sixth iterations, with each iteration of phase noise estimate accumulated and a hard decision applied after the respective second through sixth iterations. Two iterations (FIGS. 5A-5B) yield a much improved estimate and fewer subcarriers with phase noise error, but three iterations (FIGS. 6A-6B) begin to strongly match true phase noise. As seen in FIG. 6B, only a few subcarriers remain with uncorrected phase noise. The fourth and fifth iterations (FIGS. 7A-7B and 8A-8B, respectively) continue the improvement. A sixth iteration (FIGS. 9A-9B) show marginal improvement over the fifth, indicating that the point of diminishing returns (accuracy versus processing power/time) is approached or surpassed for the specific conditions of the simulation.

Figure 9A:
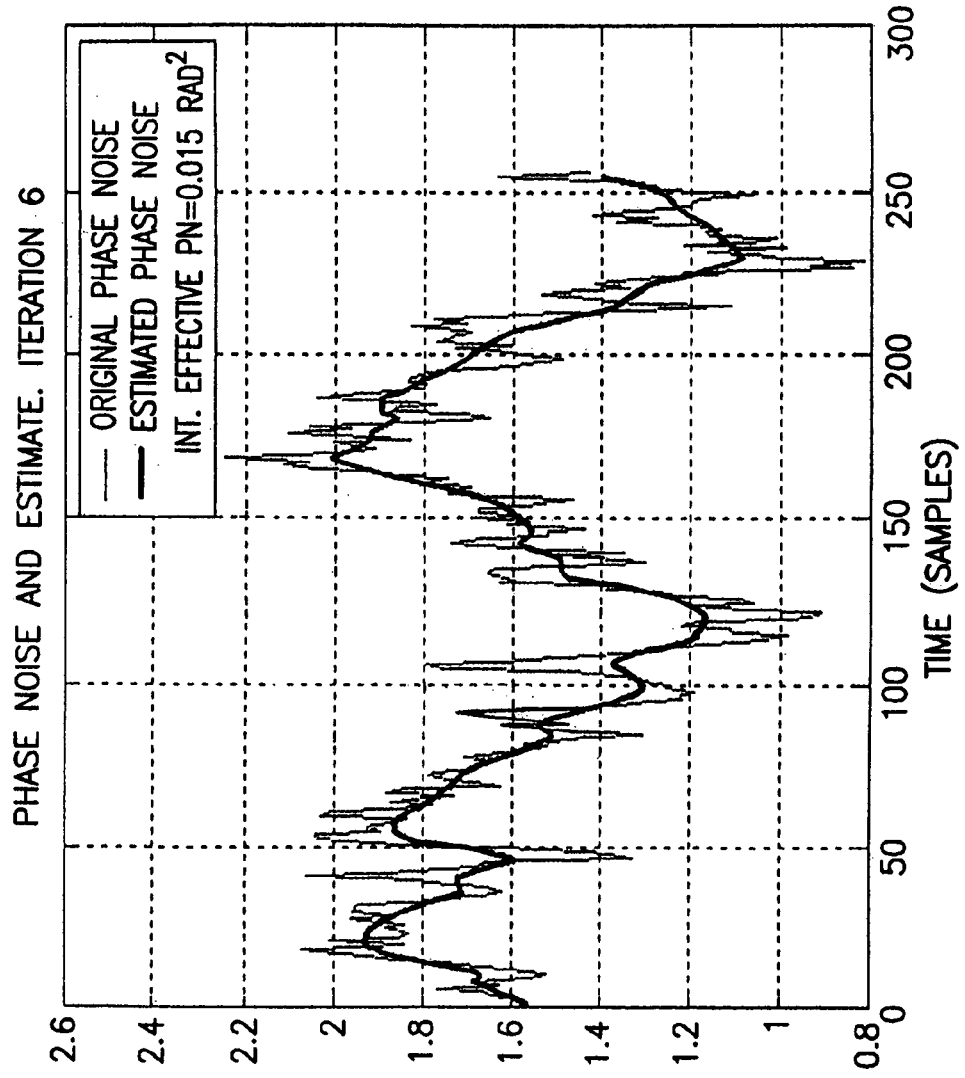
Figure 9B:
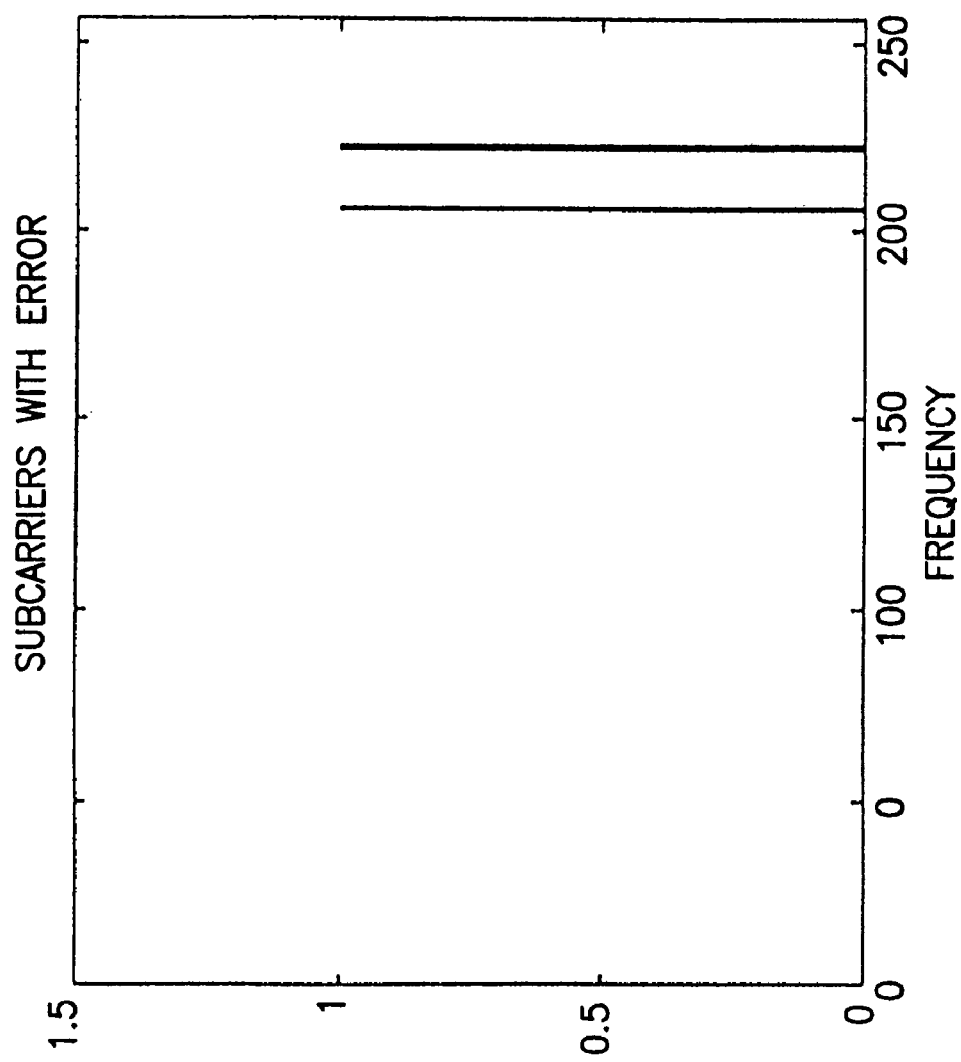
Figure 10:
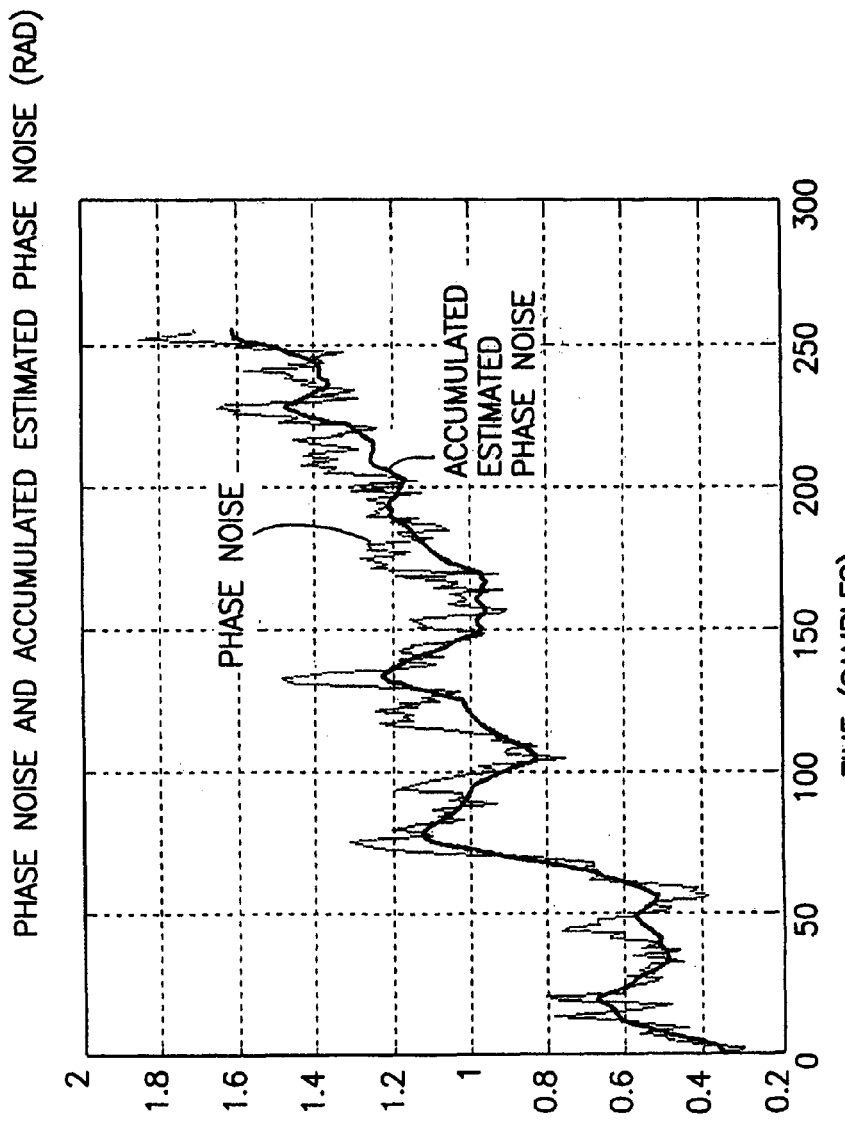
FIG. 10 is a graph showing phase noise and accumulated estimated phase noise with frequency offset correction.

FIG. 10 is for the same simulated data set using the sixth iteration of FIG. 9A, but showing accumulated phase noise estimate with corrections for frequency offsets as well. The subcarrier over which the signal is received may drift in frequency, which is the cause of phase noise and ICI in the first place. Since the fine frequency drift closely tracks the phase noise as shown in FIG. 10, the estimate of phase noise may also be applied as a fine frequency offset correction to the subcarrier in estimating the channel. Preferably, the fine frequency offset correction is applied to the buffered signal simultaneously with the phase noise correction. Doing so iteratively, just as the phase noise correction, narrows decision noise during each iteration of estimating phase noise.

Figure 11:
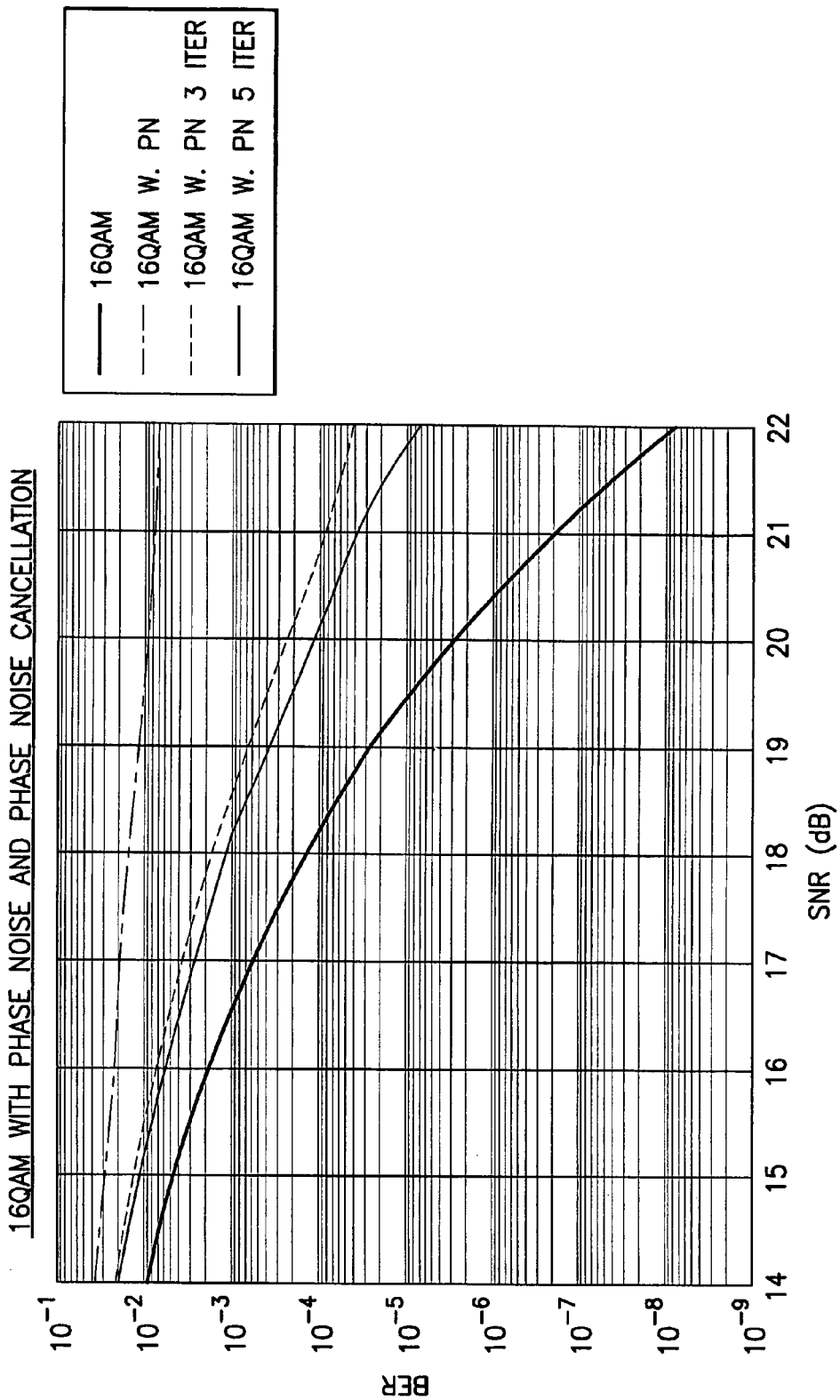
FIG. 11 is a graph showing bit error rate versus signal to noise ratio at −70 dBc for a 16 QAM signal as compared to the same signal with phase noise (uncorrected), corrected with three iterations of the described phase cancellation technique, and corrected for five iterations of the described phase cancellation technique.
Figure 12:
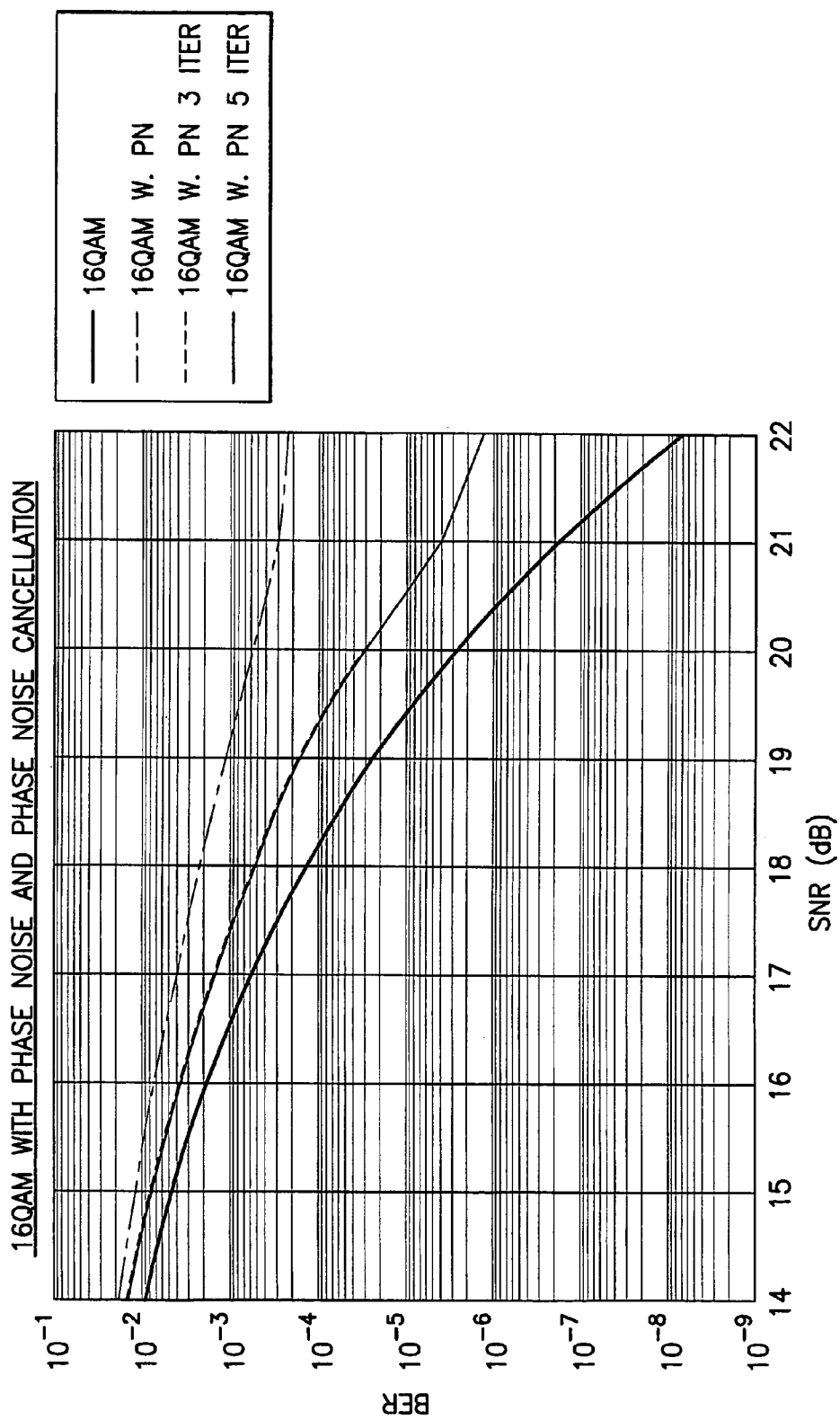
FIG. 12 is similar to FIG. 11 but for −75 dBc.

FIGS. 11-12 graph BER for various SNR ratios for true 16 QAM, 16 QAM with phase noise (abbreviated pn in the illustrations) but no correction, and 16 QAM with phase noise estimate corrections for three iterations and five iterations. The difference between FIGS. 11 and 12 is phase noise per carrier: FIG. 11 represents −70 dBc, and FIG. 12 represents −75 dBc. Other parameters of these simulations as similar to those described above for FIGS. 4A-B through 9A-B. FIGS. 11-12 make clear that embodiments of the invention, and further iterations of the phase noise estimation process described above, more closely mirror true (transmitted) 16 QAM than either no correction or correction with fewer iterations of the estimation process.

The embodiments of this invention may be implemented by computer software executable by a data processor of a mobile station or other host device, such as the processor 40, or by hardware, or by a combination of software and hardware. Further in this regard it should be noted that the various blocks of the diagram of FIGS. 2-3 may represent program steps, or interconnected logic circuits, blocks and functions, or a combination of program steps and logic circuits, blocks and functions.

The memory or memories 44 may be of any type suitable to the local technical environment and may be implemented using any suitable data storage technology, such as semiconductor-based memory devices, magnetic memory devices and systems, optical memory devices and systems, fixed memory and removable memory. The data processor(s) 42 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, and described as processes, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method comprising:
   receiving a signal over a plurality of orthogonal subcarriers and storing the signal in a buffer;
   estimating a symbol from the buffered signal;
   determining a decision noise from a difference between the buffered signal and the estimated symbol;
   estimating phase noise from the decision noise and the estimated symbol; and
   canceling the estimated phase noise from the buffered signal and estimating a phase noise corrected estimated symbol therefrom,
   determining a next iterative decision noise from the buffered signal and the phase noise corrected estimated symbol;
   estimating a next iterative phase noise from the next iterative decision noise and the phase noise corrected estimated symbol;
   accumulating all estimated phase noise for the buffered signal;
   and wherein canceling the estimated phase noise comprises canceling the accumulated estimated phase noise from the buffered signal and estimating an iteratively phase noise corrected estimated symbol therefrom.

2. The method of claim 1 further comprising repeating the determining and estimating elements of claim 1 for at least one additional iteration.

3. The method of claim 1, further comprising:
   storing the phase noise corrected estimated symbol.

4. The method of claim 1, wherein the estimated phase noise comprises computing an inverse Fourier transform on the decision noise and on the estimated symbol.

5. The method of claim 4, wherein estimating the phase noise further comprises Kalman filtering a difference between the inverse Fourier transforms of the decision noise and the estimated symbol.

6. A receiver comprising:
   circuitry configured to receive a signal over a plurality of orthogonal subcarriers;
   a buffer having an input coupled to an output of the circuitry for storing the received signal;
   an arithmetic logic block having an input configured to receive an output of the buffer for canceling an estimate of phase noise from the buffered signal;
   a symbol detector having an input configured to receive an output of the arithmetic logic block for estimating a symbol from the output of the arithmetic logic block;
   a phase noise estimator having a first input configured to receive the estimated symbol from the symbol detector and a second input configured to receive a remainder signal from the symbol detector, the remainder signal being a difference between the buffered signal and the estimated symbol;
   a first feedback loop configured to provide an output of the phase noise estimator to an input of the arithmetic logic block for providing the estimate of phase noise; and
   a second feedback loop configured to provide an output of the arithmetic logic block to an input of the buffer for replacing the signal stored in the buffer with a signal modified by the arithmetic logic block.

7. The receiver of claim 6, wherein the feedback loop comprises in series an adder and a phase noise accumulator.

8. The receiver of claim 6, wherein the phase noise estimator is configured to compute an inverse Fourier transform on the estimated symbol and the remainder signal.

9. The receiver of claim 8, wherein the phase noise estimator further comprises at least one Kalman filter configured to filter the results of the inverse Fourier transforms to yield the estimate of phase noise.

10. The receiver of claim 6 disposed within a mobile station.

11. An apparatus comprising:
    means for estimating a symbol from a buffered received signal, the means for estimating a symbol comprising a symbol estimator;
    means for iteratively estimating phase noise from the estimated symbol and a remainder signal, the remainder signal being a difference between the buffered received signal and the estimated symbol, the means for iteratively estimating phase noise comprising a phase noise estimator and a feedback loop configured to provide an output of the phase noise estimator to an input of the symbol estimator, said phase noise estimator comprising circuitry for executing an inverse Fourier transform on the estimated phase noise and the remainder signals; and
    means for canceling the iteratively estimated phase noise from the buffered received signal, the means for canceling the iteratively estimated phase noise comprising a multiplier having an input coupled to the feedback loop and an output coupled to the symbol estimator.

12. A non-transitory computer readable storage medium embodied with a program of machine-readable instructions, executable by a digital data processor, to perform actions directed toward processing a received signal, the actions comprising:
    estimating a symbol from a buffered received signal;
    determining a decision noise from a difference between the buffered received signal and the estimated symbol;
    estimating phase noise from the decision noise and the estimated symbol; and
    canceling the estimated phase noise from the buffered received signal, and estimating a phase noise corrected estimated symbol therefrom;
    storing the phase noise corrected estimated symbol;
    determining a next iterative decision noise from the buffered received signal and the phase noise corrected estimated symbol;
    estimating a next iterative phase noise from the next iterative decision noise and the phase noise corrected estimated symbol; and
    canceling the next iterative phase noise from a phase of the phase noise corrected estimated symbol to yield an iteratively phase noise corrected estimated symbol.

13. The program of claim 12, wherein the actions further comprise repeating the determining the next iterative decision noise and estimating the next iterative decision noise elements of claim 12 for at least one additional iteration.

14. The non-transitory computer readable storage medium of claim 12, wherein estimating phase noise comprises computing an inverse Fourier transform on the decision noise and on the estimated symbol.

15. The non-transitory computer readable storage medium of claim 14, wherein estimating the phase noise further comprises Kalman filtering a difference between the inverse Fourier transforms of the decision noise and the estimated symbol.

16. The non-transitory computer readable storage medium of claim 12, wherein the actions further comprise correcting a frequency offset of the buffered received signal with the estimated phase noise.

17. A non-transitory computer readable storage medium embodied with a program of machine-readable instructions, executable by a digital data processor, to perform actions directed toward processing a received signal, the actions comprising:
  estimating a symbol from a signal received over a plurality of orthogonal frequency division multiplexed subcarriers;
  iteratively estimating phase noise from the estimated symbol and a remainder signal, the remainder signal being a difference between a buffered signal and the estimated symbol, by an inverse Fourier transform; and
  canceling the iteratively estimated phase noise from the signal and estimating a phase noise corrected estimated symbol therefrom;
determining a next iterative decision noise from the buffered received signal and the phase noise corrected estimated symbol;
  estimating a next iterative phase noise from the next iterative decision noise and the phase noise corrected estimated symbol;
  accumulating all estimated phase noise for the buffered received signal;
and wherein canceling the estimated phase noise comprises canceling the accumulated estimated phase noise from the buffered received signal and estimating an iteratively phase noise corrected estimated symbol therefrom.

18. A receiver comprising:
  a symbol detector configured to estimate, from a buffered received signal, an estimated frequency domain symbol and a frequency domain decision noise, wherein the frequency domain decision noise is determined from a difference between the received signal and the estimated frequency domain symbol;
  means for converting the estimated frequency domain symbol and the frequency domain decision noise to the time domain;
  a Kalman filter for estimating phase noise from the time domain converted estimated symbol and frequency domain decision noise;
  a phase error accumulator configured to accumulate all estimated phase noise for the buffered received signal; and
  a recursive feedback loop for canceling from the received signal an accumulation of phase noise estimates from the Kalman filter, wherein cancelling the accumulation of the phase noise estimates comprises canceling the accumulated phase noise from the buffered received signal, wherein an iteratively phase noise corrected estimated symbol is estimated therefrom.

19. The receiver of claim 18, wherein the means for converting comprises a processor that executes an inverse fast Fourier transform.

20. A method comprising:
  estimating from a received signal a frequency domain symbol and a frequency domain decision noise, wherein the frequency domain decision noise is determined from a difference between the received signal and the estimated frequency domain symbol;
  converting the estimated frequency domain symbol and the frequency domain decision noise to the time domain;
  filtering the time domain converted estimated frequency domain symbol and the frequency domain decision noise to achieve a phase noise estimate;
  iteratively estimating, converting, and filtering as recited above to achieve at least one iterative estimate of phase noise; and
    canceling from the received signal the phase noise estimate and the at least one iterative estimate of phase noise and estimating a phase noise corrected estimated symbol therefrom;
determining a next iterative decision noise from the received signal and the phase noise corrected estimated symbol;
  estimating a next iterative phase noise from the next iterative decision noise and the phase noise corrected estimated symbol;
  accumulating all estimated phase noise for the received signal; and wherein canceling the estimated phase noise comprises canceling the accumulated estimated phase noise from the received signal and estimating an iteratively phase noise corrected estimated symbol therefrom.

* * * * *